US006196834B1

United States Patent
Berger

(10) Patent No.: US 6,196,834 B1
(45) Date of Patent: Mar. 6, 2001

(54) OXY-FUEL IGNITOR

(75) Inventor: Stephan U. Berger, West Salem, OH (US)

(73) Assignee: AGA Gas, Inc., Independence, OH (US)

( * ) Notice: Subject to any disclaimer, the term of this patent is extended or adjusted under 35 U.S.C. 154(b) by 0 days.

(21) Appl. No.: 09/449,205

(22) Filed: Nov. 24, 1999

Related U.S. Application Data

(63) Continuation of application No. 60/109,930, filed on Nov. 25, 1998.

(51) Int. Cl.[7] .............................. F23Q 9/00; F23G 14/46
(52) U.S. Cl. .......................................... 431/266; 431/187
(58) Field of Search ................................. 431/187, 266, 431/265; 60/39, 827, 826; 123/146.5 R; 313/120

(56) References Cited

U.S. PATENT DOCUMENTS

| | | | |
|---|---|---|---|
| 2,013,979 | * 9/1935 | Bray | 431/266 |
| 2,860,695 | * 11/1958 | Lake | 431/266 |
| 3,007,084 | * 10/1961 | Thomasian et al. | 431/266 |
| 3,070,153 | * 12/1962 | Flynn | 431/266 |
| 3,265,114 | * 8/1966 | Childree | 431/266 |
| 3,361,185 | * 1/1968 | Anderson et al. | 431/266 |
| 3,612,738 | * 10/1971 | Jones et al. | 431/265 |
| 3,701,517 | 10/1972 | Gray . | |
| 4,347,982 | 9/1982 | Wright . | |
| 4,732,093 | 3/1988 | Hansen et al. . | |
| 4,892,475 | 1/1990 | Farrenkopf et al. . | |
| 5,104,310 | 4/1992 | Saltin . | |
| 5,217,363 | * 6/1993 | Brais et al. | 431/266 |
| 5,500,030 | 3/1996 | Joshi et al. . | |
| 5,575,637 | 11/1996 | Slavejkov et al. . | |
| 5,580,237 | 12/1996 | Leger . | |
| 5,611,682 | 3/1997 | Slavejkov et al. . | |
| 5,692,890 | 12/1997 | Graville . | |
| 5,743,723 | 4/1998 | Iatrides et al. . | |
| 5,839,890 | 11/1998 | Snyder . | |

FOREIGN PATENT DOCUMENTS

1188459 * 10/1985 (SU) ..................................... 431/266

* cited by examiner

Primary Examiner—Carl D. Price
(74) Attorney, Agent, or Firm—Pearne & Gordon LLP

(57) ABSTRACT

An ignitor for use with an industrial oxy-fuel burner, the ignitor being able to ensure ignition of a pilot flame in order to enable automatic ignition of an oxy-fuel burner. The ignitor is characterized by two tubes, one inside the other, concentrically arranged with respect to an electric ignitor rod at the center, the tubes and the ignitor rod forming two annuli for the delivery of oxygen and fuel gas from their respective manifolds to an open end of the tubes for ignition by the ignitor rod. The manifolds are each formed from a single piece of material. The ignitor rod is removable from the rest of the ignitor assembly by means of a pipe-threaded adapter at the rear of the assembly.

20 Claims, 4 Drawing Sheets

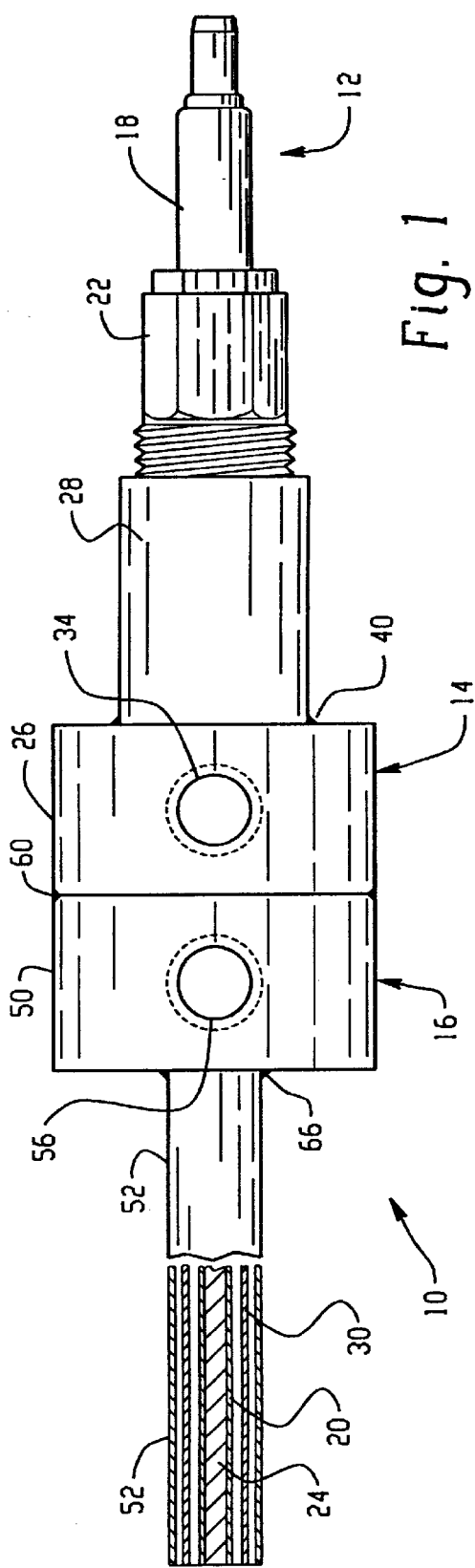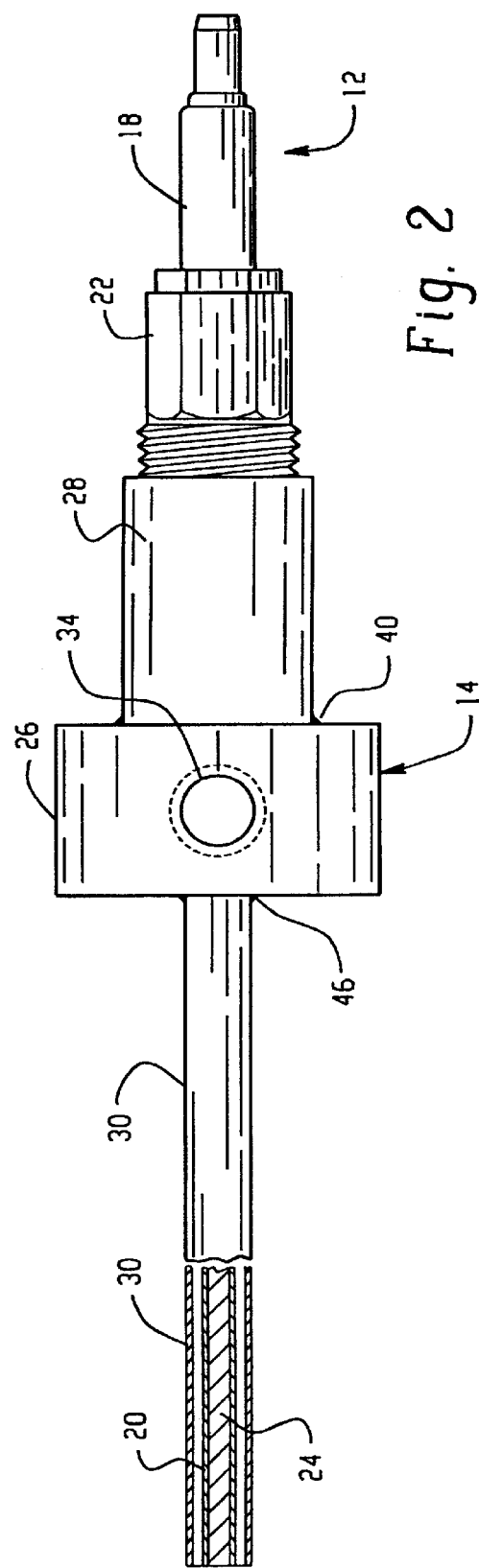

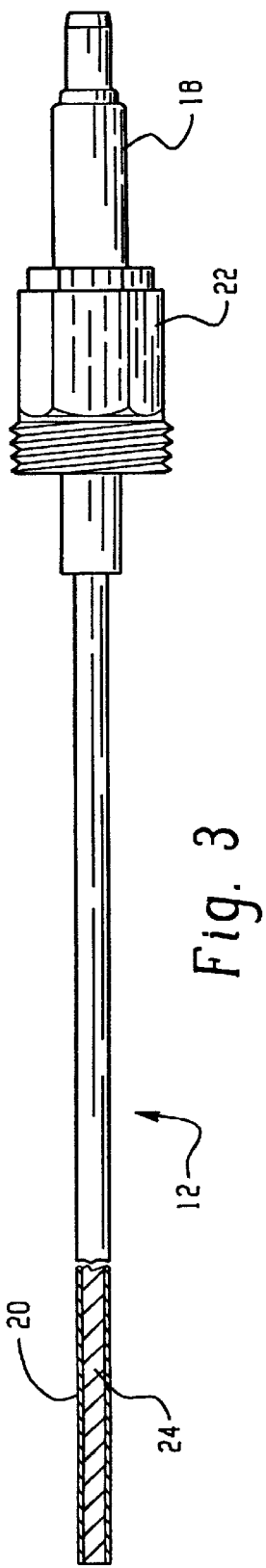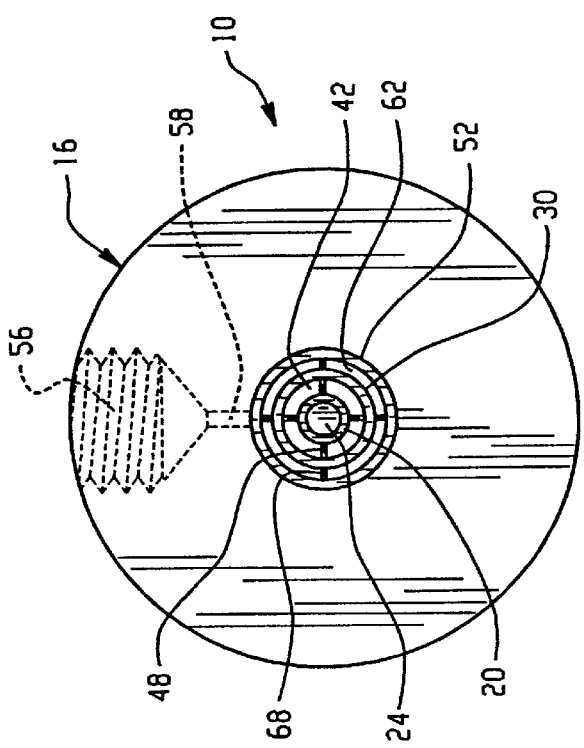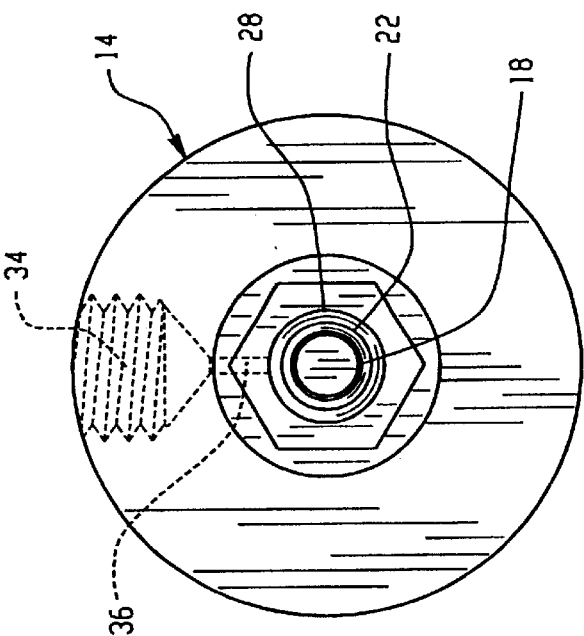

OXY-FUEL IGNITOR

This application claims benefit of Provisional Application 60/109,930 filed Nov. 25, 1998.

BACKGROUND OF THE INVENTION

The present invention generally relates to pilot burners and, more specifically, to pilot burners for automatic ignition of oxy-fuel burners.

For automatic ignition of an oxy-fuel burner it is necessary to have a pilot burner and control equipment which ensures that the pilot burner is operating before the main burner begins to operate. The pilot burner typically operates on a gaseous fuel such as propane and oxygen as oxidant rather than air. The use of oxygen offers the advantages of safe operation, high capacity, and small dimensions.

While prior art pilot burners have generally performed their function, they are relatively complicated and are relatively expensive to produce. Accordingly, there is a need in the art for an improved pilot burner which is relatively simple in construction, is relatively inexpensive to produce, and has improved reliability and ease of service.

BRIEF SUMMARY OF THE INVENTION

The invention provides a pilot burner assembly including an ignitor having an electrically conducting rod extending axially from an ignitor head. An axially extending first tube is disposed around the ignitor rod to form a first fluid passageway and has a first tube opening. A first manifold has an eccentric first axial bore therein, a first manifold opening for attachment to a first fluid supply fitting, and a first lateral passageway communicating the first manifold opening with the first axial bore. The first tube is disposed at the first axial bore and the first tube opening cooperates with the first lateral passageway to communicate the first manifold opening with the first fluid passageway. A coupling is provided having an axial coupling bore. The coupling is attached to the first manifold such that the axial coupling bore is aligned with the first axial bore and the ignitor head is received in the coupling such that the ignitor projects through the coupling. An axially extending second tube is disposed around the first tube to form a second fluid passageway and has a second tube opening. A second manifold has an eccentric second axial bore therein, a second manifold opening for attachment to a second fluid supply fitting, and a second lateral passageway communicating the second manifold opening with the second axial bore. The second tube is disposed at the second axial bore, the second tube opening cooperates with the second lateral passageway to communicate the second manifold opening with the second fluid passageway, and the second manifold is attached to the first manifold such that the second axial bore is aligned with the first axial bore and the second manifold opening extends laterally in substantially the same direction as the first manifold opening.

The ignitor rod is fitted with an electrically insulating sleeve. The ignitor head is externally threaded and the coupling is internally threaded. The pilot burner also includes an internally and externally threaded adaptor. The adaptor receives the ignitor head therein and the adaptor is received in the coupling such that the ignitor projects through the adaptor and the coupling.

The first tube is disposed concentrically around the ignitor rod and the first fluid passageway is annular. Spacers are disposed between the first tube and the ignitor rod to maintain the ignitor rod substantially concentric in the first tube. The first tube opening is lateral and the first manifold comprises a cylindrical wafer. The first manifold opening is internally threaded. The coupling is a cylindrical wafer. The axial coupling bore has a smaller diameter than the first axial bore, the first axial bore extends through the first manifold, and an end of the first tube abuts against the coupling. The axial coupling bore is concentric with the first axial bore. The second tube is disposed concentrically around the first tube and the second passageway is annular. Spacers disposed the between the first tube and the second tube to maintain the first tube substantially concentric in the second tube. The second tube opening is lateral. The second manifold is a cylindrical wafer. The second manifold opening is internally threaded. The second axial bore has a greater diameter than the first axial bore, the second axial bore extends through the second manifold, and an end of the second tube abuts against the first manifold. The second axial bore is concentric with the first axial bore. The manifolds are formed of a single piece of material.

BRIEF DESCRIPTION OF THE SEVERAL VIEWS OF THE DRAWING

These and further features of the present invention will be apparent with reference to the following description and drawings, wherein:

FIG. 1 is a plan view, partially broken away, of a pilot burner for automatic ignition of oxy-fuel burners according to the present invention;

FIG. 2 is a plan view, partially broken away, of the pilot burner of FIG. 1 in a partially assembled condition;

FIG. 3 is a plan view, partially broken away, of an ignitor assembly of the pilot burner of FIG. 1;

FIG. 4 is a rear elevational view of the pilot burner of FIG. 1;

FIG. 5 is an enlarged front elevational view of the pilot burner of FIG. 1;

DETAILED DESCRIPTION OF PREFERRED EMBODIMENTS

Figure 6:
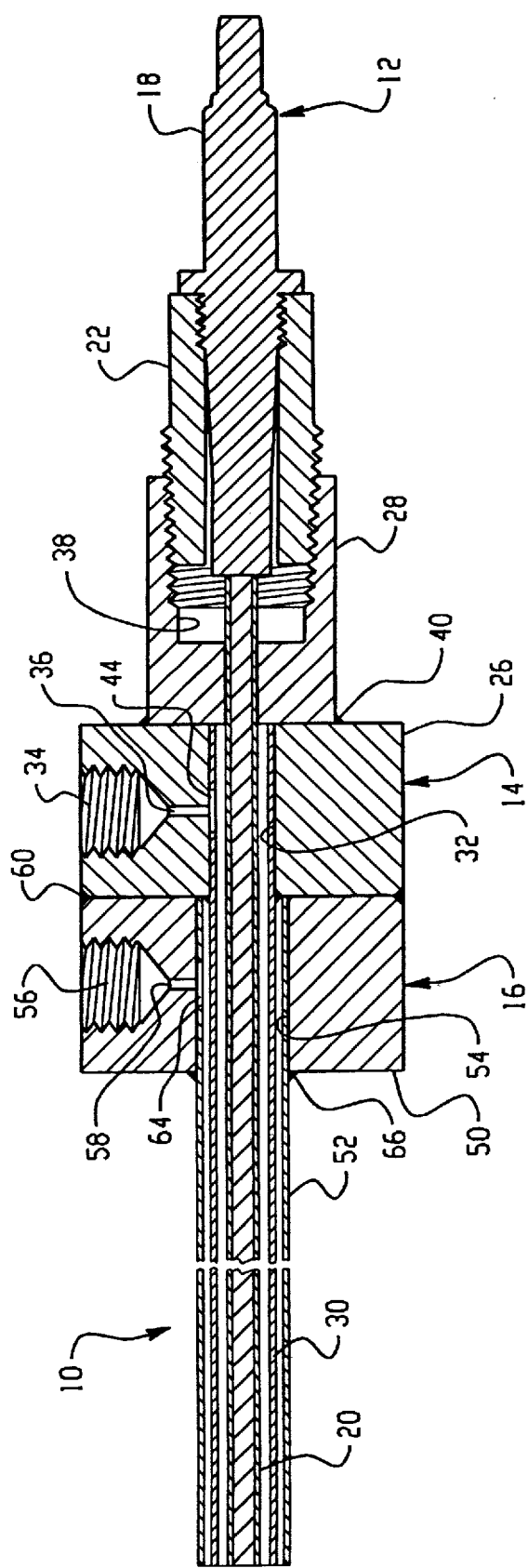
FIG. 6 is a cross-sectional view taken along line 66 of FIG. 1.

FIGS. 1–6 illustrate a pilot burner 10 according to the present invention which includes an ignitor assembly 12, an oxidant manifold assembly 14, and a fuel or gas manifold assembly 16. As best shown in FIG. 3, the ignitor assembly 12 includes an ignitor 18, an insulator sleeve 20, and a threaded adapter 22. The ignitor 18 has a rod 24 extending axially from an externally threaded head. The rod 24 is sized to extend the full length of the pilot burner 10 such as, for example, 10 inches. A suitable ignitor 18 is Crown ignitor #21065. The insulator sleeve 20 is sized to extend the full length of the ignitor rod 24 and to closely fit onto the rod 24 and electrically insulate the rod from the oxidant manifold assembly 14. For a rod 24 having an outer diameter of about ⅛ inch, for example, the insulator sleeve 20 can have an inner diameter of about ⅛ inch and an outer diameter of about 3⁄16 inches. The insulator sleeve 20 can be of any suitable electrically insulating material which can meet required environmental conditions such as, for example alumina. The threaded adapter 22 is a standard pipe adapter for connecting the external thread of the ignitor 18 with the internal thread of the oxidant manifold assembly 14 as described in more detail hereinafter.

As best shown in FIGS. 2 and 6, the oxidant manifold assembly 14 includes an oxidant manifold 26, a coupling 28, and an oxidant tube 30. The oxidant manifold 26 has an axially extending opening or bore 32 therethrough which is sized for closely receiving the oxidant tube 30 as described in more detail hereinafter. The oxidant manifold 26 also has a radially extending opening 34. The opening 34 is sized and adapted for receiving a threaded check valve of an oxidant supply line. Preferably, the opening 34 is partially threaded, such as ½ inch pipe thread, and has an unthreaded frusto-conically shaped bottom surface. A small radially extending passage 36 connects the bottom surface of the opening 34 with the bore 32 to provide gas flow communication between the opening 34 and the bore 32. The oxidant manifold 26 is preferably a wafer of standard bar stock and more preferably a wafer of a standard round bar stock. The bore 32 is preferably eccentric or offset from the center of the manifold 26 so that a smaller size of common bar stock can be utilized while providing adequate space for the opening 34. The oxidant manifold 26 can be formed of any suitable material such as, for example, stainless steel.

The coupling 28 has an axially extending opening 38 sized and adapted for receiving the ignitor assembly 12 therein. Preferably, the opening 38 has an internal thread, such as a ½ pipe thread, for receiving the external thread of the adapter 22 of the ignitor assembly 12. The coupling 28 is rigidly secured to the oxidant manifold 26 with the bore 32 and opening 38 generally coaxially aligned such that the ignitor rod 24 and the insulator sleeve 20 extend through the oxidant manifold bore 32. Preferably, the coupling 26 and the oxidant manifold 26 are welded together by a bead 40 extending around the entire periphery of the coupling 28 as shown to both secure the coupling 28 and the oxidant manifold 26 together and seal the interface therebetween. The coupling 28 can be formed of any suitable material such as, for example, stainless steel.

The oxidant tube 30 is sized to closely fit within the bore 32 of the oxidant manifold 26 and to extend the full length of the ignitor rod 24 and the insulator sleeve 20. The oxidant tube 30 fully extends into the bore 32 and abuts the forward end of the coupling 28 with the ignitor rod 24 and the insulator sleeve 20 axially extending through the oxidant tube 30. The inner diameter of the oxidant tube 30 is sized to form a first or oxidant annular passageway 42 for the oxidant between the inner surface of the oxidant tube 30 and the outer surface of the insulator sleeve 20. For an insulator sleeve 20 having an outer diameter of about 3/16 inches, for example, the oxidant tube 30 can have an outer diameter of about 3/8 inches and a wall thickness of about 0.035 inches.

At least one opening 44 is preferably provided in the oxidant tube 30 to cooperate with the oxidant manifold passageway 36 to communicate the oxidant manifold passageway 36 with the first annular passageway 42. The oxidant tube 30 is rigidly secured to the oxidant manifold 26 with the passageway 36 and the opening 44 aligned. Preferably, the oxidant tube 30 and the oxidant manifold 26 are welded together by a bead 46 extending around the entire periphery of the oxidant tube 30 as shown to both secure the oxidant tube 30 and the oxidant manifold 26 together and seal the interface therebetween. The oxidant tube 30 can be formed of any suitable material such as, for example, stainless steel.

As shown in FIG. 5, suitable spacers 48 are provided for maintaining the oxidant tube 30 and the ignitor rod 24 generally coaxial to maintain the shape of the first annular passageway 42. The spacers 48 can advantageously be spot welds between the tube 30 and the sleeve 20.

As best shown in FIG. 1, the gas manifold assembly 16 includes a gas manifold 50 and a gas tube 52. The gas manifold 50 has an axially extending opening or bore 54 therethrough which is sized for closely receiving the gas tube 52 as described in more detail hereinafter. The gas manifold 50 also has a radially extending opening 56. The radial opening 56 is sized and adapted for receiving a threaded check valve of a gas supply line. Preferably, the opening 56 is partially threaded and has an unthreaded frusto-conically shaped bottom surface. A small radially extending passage 58 connects the bottom surface of the opening 56 with the bore 54 to provide gas flow communication between the opening 56 and the bore 54. The gas manifold 50 is preferably a wafer of standard bar stock and more preferably a wafer of a standard round bar stock. The gas manifold 50 can be formed of any suitable material such as, for example, stainless steel. Preferably, the gas manifold 50 and the oxidant manifold 26 are substantially identical except for the diameters of the respective bores 54, 32 therethrough.

The gas manifold 50 is rigidly secured to the oxidant manifold 26 with the bores 54, 32 generally coaxial and the oxidant tube 30, the ignitor rod 24, and the insulator sleeve 20 extending through the gas manifold bore 54. Preferably, the gas manifold 50 and the oxidant manifold 26 are welded together by a bead 60 extending around the entire periphery of the manifolds 26, 50 as shown to both secure the gas manifold 50 and the oxidant manifold 26 together and seal the interface therebetween.

The gas tube 52 is sized to closely fit within the bore 54 of the gas manifold 50 and to extend the full length of the ignitor rod 24, the insulator sleeve 20, and the oxidant tube 30. The gas tube 52 fully extends into the bore 54 and abuts the forward end of the oxidant manifold 26 with the oxidant tube 30, the ignitor rod 24, and the insulator sleeve 20 axially extending through the gas tube 52. The inner diameter of the gas tube 52 is sized to form a second or gas annular passageway 62 for the gas between the inner surface of the gas tube 52 and the outer surface of the oxidant tube 30. For an oxidant tube 30 having an outer diameter of about 3/8 inches, for example, the gas tube 52 can have an outer diameter of about ½ inch and a wall thickness of about 0.049 inches.

At least one opening 64 is preferably provided in the gas tube 52 to cooperate with the gas manifold passageway 58 to communicate the gas manifold passageway 58 with the second annular passageway 62. The gas tube 52 is rigidly secured to the gas manifold 50 with the passageway 58 and the opening 64 aligned. Preferably, the gas tube 52 and the gas manifold 50 are welded together by a bead 66 extending around the entire periphery of the gas tube 52 as shown to both secure the gas tube 52 and the gas manifold 50 together and seal the interface therebetween. The gas tube 52 can be formed of any suitable material such as, for example, stainless steel.

As shown in FIG. 5, suitable spacers 68 are provided for maintaining the gas tube 52 and the oxidant tube 30 generally coaxial to maintain the shape of the second annular passageway 62. The spacers 68 can advantageously be spot welds between the tubes 30, 52.

With the ignitor assembly 12, the oxidant manifold assembly 14, and the gas manifold assembly 16 assembled in this manner, the first and second annular passageways provide adjacent and coaxial paths for the oxidant and the gas respectively (best shown in FIG. 5). While the illustrated embodiment has been described with the first or inner passageway 42 being provided for the oxidant and the second or outer passageway 62 being provided for the gas, it should be noted that the use of the passageways 42, 62 can be interchanged. The second or outer passageway 62, however, is preferably used for the gas because it may be maintained at a higher temperature and therefore it is less likely to have condensation formed therein. Note that the flowing oxygen can act as a coolant. When the gas is supplied in an inner passageway which is isolated or insulated from the heat of exterior flames, the temperature of the gas can drop within the passageway until condensate is formed therein. As appreciated by those skilled in the art, this is a situation to be avoided.

Figure 7:
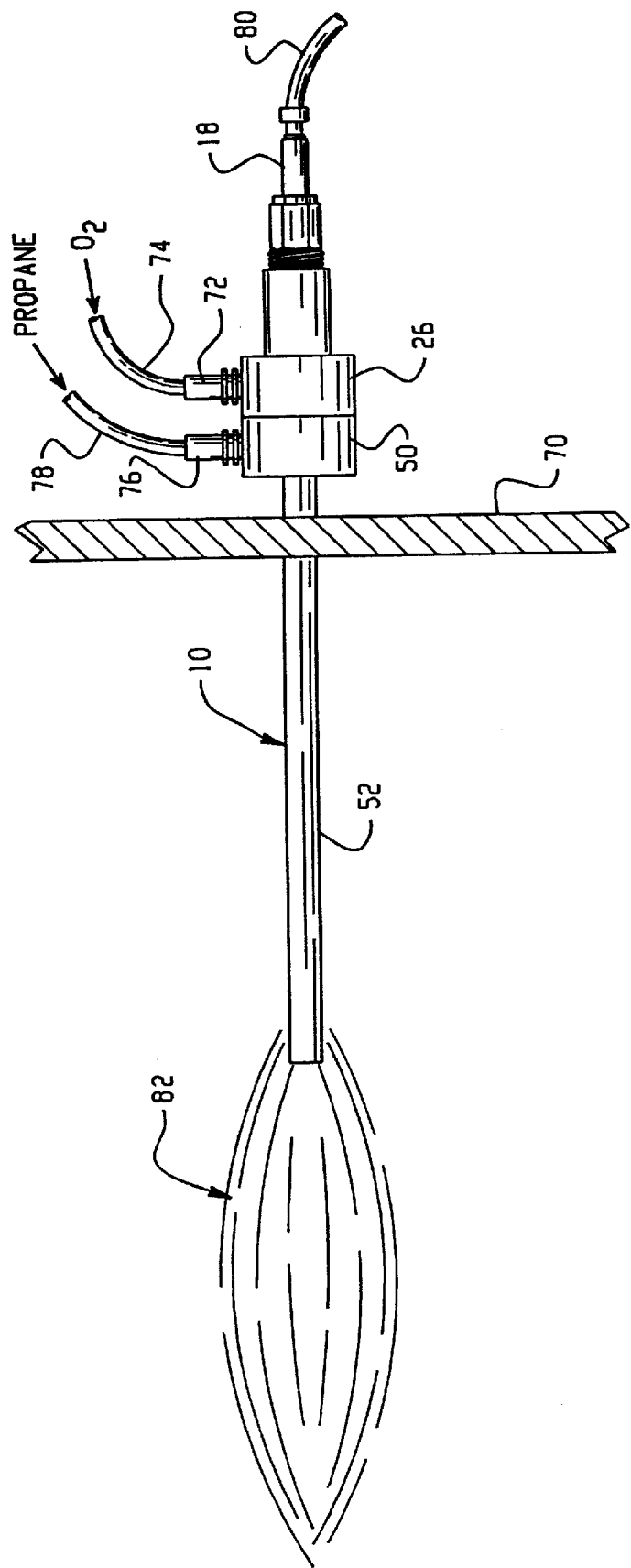
FIG. 7 is an elevational view of the pilot burner of FIG. 1 installed in a furnace wall.

FIG. 7 illustrates the above-described pilot burner 10 installed in the wall 70 of a furnace. The rod 24, sleeve 20, and tubes 30, 52 of the pilot burner 10 extend through the wall 70 such that the manifolds 26, 50 are on the outside of the furnace wall 70 and the free ends of the rod 24, sleeve 20, and tubes 30, 52 are on the inside of the furnace wall 70. The pilot burner 10 is secured to the furnace wall 70 in any suitable manner. A first fitting, such as a check valve 72, connects an oxidant supply line 74, preferably oxygen, to the opening 34 of the oxidant manifold 26 and a second fitting, such as a check valve 76, connects a gaseous fuel supply line 78, preferably propane, to the opening 56 of the gas manifold 50. A cable 80 connects a transformer to the ignitor to selectively supply a suitable voltage thereto.

To fire the pilot burner 10, an electric spark is generated by means of the transformer and the ignitor 18. The first check valve 72 is opened to initiate a flow of oxygen through the first check valve 72, the oxidant manifold opening 34, the passageway 36, the oxidant tube opening 44 and into the first annular passageway 42. The oxygen flows down the first annular passageway 42 to the forward free end of the oxidant tube 30 where it exits the pilot burner 10. The second check valve 76 is opened to initiate a flow of gas through the second check valve 76, the gas manifold opening 56, the passageway 58, the gas tube opening 64 and into the second annular passageway 62. The gas flows down the second annular passageway 62 to the forward free end of the gas tube 52 where it exits the pilot burner 10. Preferably, each of these operations are performed by an automatic controller. Once the gas and oxygen each arrive at the forward end of the pilot burner 10, the desired flame 82 is obtained.

Typically, a UV sensor monitors the pilot burner 10 to verify that it in fact is successfully burning. Once such verification is made, the sensor signals the controller to activate the main burner of the furnace.

It can be appreciated from the above description, that the pilot burner 10 of the present invention is relatively simple and inexpensive to produce. Seals are achieved by welds and pipe threads. The manifolds are machined from common bar stock. The assembly is relatively reliable and easy to service with simple seals and simple removal of the ignitor. It can also be appreciated that the modular nature of the manifold and tube assemblies enables additional manifolds and tubes to be stacked beyond the two of the illustrated pilot burner if additional concentric annular passageways are desired.

The present disclosure describes several embodiments of the invention, however, the invention is not limited to these embodiments. Other variations are contemplated to be within the spirit and scope of the invention and appended claims.

What is claimed is:

1. A pilot burner assembly comprising:
    an ignitor comprising an electrically conducting rod extending axially from an ignitor head;
    an axially extending first tube disposed around the ignitor rod to form a first fluid passageway and having a first tube opening;
    a first manifold having an eccentric first axial bore therein, a first manifold opening for attachment to a first fluid supply fitting, and a first lateral passageway communicating the first manifold opening with the first axial bore, wherein the first tube is disposed at the first axial bore and the first tube opening cooperates with the first lateral passageway to communicate the first manifold opening with the first fluid passageway;
    a coupling having an axial coupling bore, wherein the coupling is attached to the first manifold such that the axial coupling bore is aligned with the first axial bore and the ignitor head is received in the coupling such that the ignitor projects through the coupling;
    an axially extending second tube disposed around the first tube to form a second fluid passageway and having a second tube opening; and
    a second manifold having an eccentric second axial bore therein, a second manifold opening for attachment to a second fluid supply fitting, and a second lateral passageway communicating the second manifold opening with the second axial bore, wherein the second tube is disposed at the second axial bore, the second tube opening cooperates with the second lateral passageway to communicate the second manifold opening with the second fluid passageway, and the second manifold is attached to the first manifold such that the second axial bore is aligned with the first axial bore and the second manifold opening extends laterally in substantially the same direction as the first manifold opening.

2. The pilot burner according to claim 1 wherein the ignitor rod is fitted with an electrically insulating sleeve.

3. The pilot burner according to claim 1 wherein the ignitor head is externally threaded, the coupling is internally threaded, and the pilot burner further comprises an internally and externally threaded adaptor, the adaptor receiving, the ignitor head therein and the adaptor being received in the coupling such that the ignitor projects through the adaptor and the coupling.

4. The pilot burner according to claim 1 wherein the first tube is disposed concentrically around the ignitor rod and the first fluid passageway is annular.

5. The pilot burner according to claim 4 further comprising spacers disposed between the first tube and the ignitor rod to maintain the ignitor rod substantially concentric in the first tube.

6. The pilot burner according to claim 1 wherein the first tube opening is lateral.

7. The pilot burner according to claim 1 wherein the first manifold comprises a cylindrical wafer.

8. The pilot burner according to claim 1 wherein the first manifold opening is internally threaded.

9. The pilot burner according to claim 1 wherein the coupling comprises a cylindrical wafer.

10. The pilot burner according to claim 1 wherein the axial coupling bore has a smaller diameter than the first axial bore, the first axial bore extends through the first manifold, and an end of the first tube abuts against the coupling.

11. The pilot burner according to claim 1 wherein the axial coupling bore is concentric with the first axial bore.

12. The pilot burner according to claim 1 wherein the second tube is disposed concentrically around the first tube and the second passageway is annular.

13. The pilot burner according to claim 12 further comprising spacers disposed between the first tube and the second tube to maintain the first tube substantially concentric in the second tube.

14. The pilot burner according to claim 1 wherein the second tube opening is lateral.

15. The pilot burner according to claim 1 wherein the second manifold comprises a cylindrical wafer.

16. The pilot burner according to claim 1 wherein the second manifold opening is internally threaded.

17. The pilot burner according to claim 1 wherein the second axial bore has a greater diameter than the first axial bore, the second axial bore extends through the second manifold, and an end of the second tube abuts against the first manifold.

18. The pilot burner according to claim 1 wherein the second axial bore is concentric with the first axial bore.

19. The pilot burner according to claim 1 wherein the manifolds are formed of a single piece of material.

20. A pilot burner assembly comprising:

an ignitor comprising an electrically conducting rod fitted with an electrically insulating sleeve and extending axially from an externally threaded ignitor head;

an axially extending oxidant tube disposed concentrically around the ignitor rod to form an annular oxidant passageway and having a lateral oxidant tube opening;

an oxidant manifold comprising a cylindrical wafer having an eccentric axial oxidant bore therethrough, an internally threaded oxidant opening, and a radial oxidant passageway communicating the oxidant opening with the axial oxidant bore, wherein the oxidant tube is disposed in the axial oxidant bore and the oxidant tube opening cooperates with the radial oxidant passageway to communicate the oxidant opening with the annular oxidant passageway;

spacers disposed the between the oxidant tube and the sleeve to maintain the ignitor rod substantially concentric in the oxidant tube;

an internally threaded coupling comprising a cylindrical wafer having an axial coupling bore having a smaller diameter than the axial oxidant bore, wherein the coupling is welded to the oxidant manifold such that the axial coupling bore is concentric with the axial oxidant bore and an end of the oxidant tube abuts against the coupling wafer;

an internally and externally threaded adaptor, the adaptor receiving the ignitor head therein and the adaptor being received in the coupling such that the ignitor projects through the adaptor and the coupling;

an axially extending fuel tube disposed concentrically around the annular oxidant passageway to form an annular fuel passageway and having a lateral fuel tube opening;

a fuel manifold comprising a cylindrical wafer having an eccentric axial fuel bore therethrough having a greater diameter than the axial oxidant bore, an internally threaded fuel opening, and a radial fuel passageway communicating the fuel opening with the axial fuel bore, wherein the fuel tube is disposed in the axial fuel bore, the fuel tube opening cooperates with the radial fuel passageway to communicate the fuel opening with the annular fuel passageway, and the fuel manifold is welded to the oxidant manifold such that the axial fuel bore is concentric with the axial oxidant bore, an end of the fuel tube abuts against the oxidant manifold wafer, and the fuel opening extends laterally in substantially the same direction as the oxidant opening; and spacers disposed the between the oxidant tube and the fuel tube to maintain the oxidant tube substantially concentric in the fuel tube.

* * * * *